(12) United States Patent
Blong et al.

(10) Patent No.: US 9,749,708 B2
(45) Date of Patent: Aug. 29, 2017

(54) CROWDSOURCING-ENHANCED AUDIO

(71) Applicant: Verizon Patent and Licensing Inc., Arlington, VA (US)

(72) Inventors: Devin Blong, Penngrove, CA (US); Kevin Flores, San Jose, CA (US); Tushar Chaudhary, San Francisco, CA (US); Manish Sharma, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/942,650

(22) Filed: Nov. 16, 2015

(65) Prior Publication Data

US 2017/0142498 A1    May 18, 2017

(51) Int. Cl.
*H04N 21/439* (2011.01)
*H04N 21/475* (2011.01)
*H04N 21/4788* (2011.01)
*H04N 21/81* (2011.01)
*H04N 21/41* (2011.01)
*H04N 21/414* (2011.01)
*H04N 21/422* (2011.01)
*H04N 21/442* (2011.01)
*H04N 21/462* (2011.01)
*H04N 21/845* (2011.01)

(52) U.S. Cl.
CPC ..... *H04N 21/8106* (2013.01); *H04N 21/4126* (2013.01); *H04N 21/41407* (2013.01); *H04N 21/42203* (2013.01); *H04N 21/439* (2013.01); *H04N 21/44213* (2013.01); *H04N 21/4622* (2013.01); *H04N 21/475* (2013.01); *H04N 21/4788* (2013.01); *H04N 21/8456* (2013.01)

(58) Field of Classification Search
USPC ............................................................ 725/9
See application file for complete search history.

(56) References Cited

U.S. PATENT DOCUMENTS

| | | | | |
|---|---|---|---|---|
| 2006/0274166 A1* | 12/2006 | Lee | .......... | G11B 27/10 348/231.99 |
| 2007/0214471 A1* | 9/2007 | Rosenberg | ............. | H04H 20/38 725/24 |
| 2009/0063419 A1* | 3/2009 | Nurminen | .......... | G06F 17/30817 |
| 2012/0096084 A1* | 4/2012 | Grigsby | ................ | G06Q 50/01 709/204 |
| 2012/0150903 A1* | 6/2012 | Davis | ..................... | H04N 5/765 707/769 |
| 2012/0239645 A1* | 9/2012 | Li | ..................... | G06F 17/30244 707/727 |
| 2012/0296972 A1* | 11/2012 | Backer | ................... | H04L 65/60 709/204 |

(Continued)

*Primary Examiner* — Nathan Flynn
*Assistant Examiner* — Caroline Somera

(57) ABSTRACT

Crowdsourcing techniques may be used to enhance the experience of users viewing and/or listening to content (e.g., live and/or pre-recorded content, such as movies, sporting events, etc.). A server device may analyze audio, captured by multiple user devices, in order to determine trigger points, in the content. The trigger point may be a time point in the content, at which the captured audio, received from multiple user devices, should be played by subsequent user devices that play back the content.

20 Claims, 9 Drawing Sheets

(56) References Cited

U.S. PATENT DOCUMENTS

| | | | |
|---|---|---|---|
| 2013/0345840 A1* | 12/2013 | Lempel | G06Q 30/0255 |
| | | | 700/94 |
| 2014/0125703 A1* | 5/2014 | Roveta | G06T 19/006 |
| | | | 345/633 |
| 2015/0229975 A1* | 8/2015 | Shaw | H04N 21/23439 |
| | | | 725/10 |
| 2015/0245106 A1* | 8/2015 | Tian | H04N 21/242 |
| | | | 725/40 |
| 2015/0382057 A1* | 12/2015 | Huang | H04N 21/2543 |
| | | | 725/14 |

* cited by examiner

CROWDSOURCING-ENHANCED AUDIO

BACKGROUND

Content providers and content producers, such as those who provide and create video content, often seek ways to enhance the content. Such content may include live broadcasts of sporting events, on-demand or broadcasted comedy shows, pre-recorded movies, etc. Audiences may often audibly respond to content as they view the content, such as by laughing, gasping, crying, screaming, etc.

DETAILED DESCRIPTION OF PREFERRED EMBODIMENTS

The following detailed description refers to the accompanying drawings. The same reference numbers in different drawings may identify the same or similar elements.

Content providers and/or content producers may seek to enhance content (e.g., streaming, pre-recorded, and/or live broadcasted video content), by adding audience reactions to the content, such as laughter, gasping, crying, or other audible reactions. The addition of such reactions may increase the immersive experience of viewers accessing the content. For instance, in a stand-up comedy presentation, the addition of laughter from actual viewers of the content may make subsequent viewers feel like they are in a comedy club watching the comedy performance. As another example, the addition of gasps or screams, from actual viewers of a horror movie, may add to the excitement or suspense of subsequent viewers. As referred to herein, such types of noises may be referred to as "non-speech utterances," which may be different from "speech" (e.g., words, phrases, conversational speaking, etc.).

Figure 1:
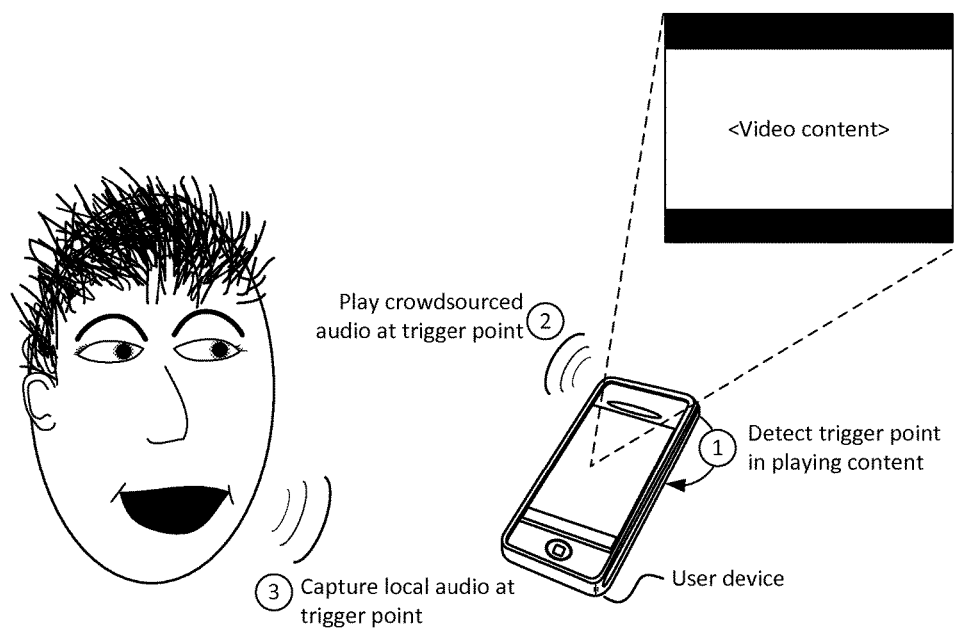
FIG. 1 illustrates an example overview of one or more implementations described herein, in which a user device may capture local audio at a trigger point during the presentation of content, and/or may play back crowdsourced audio at the trigger point.

FIG. 1 illustrates an example overview of one or more implementations described herein, in which a user device may capture local audio at a trigger point during the presentation of content, and/or may play back crowdsourced audio at the trigger point. For example, as shown, assume that a user device (e.g., a mobile telephone) is playing video content, such as a movie. In accordance with some implementations, the user device (e.g., an application running on the user device) may detect (at "1") a trigger point in the video content. As described herein, the trigger point may be manually defined (e.g., by a content provider) and/or may be dynamically determined (e.g., based on previous user reactions to the content).

Based on detecting the trigger event, the user device may play (at "2") crowdsourced audio that corresponds to the trigger event. The crowdsourced audio may be audio that was previously captured by other user devices, at the trigger event, during presentation of the content. For example, assuming that the content is a horror movie, the trigger content may have been defined by the content provider as corresponding to a particularly alarming scene in the movie. At the time that corresponds to the trigger event, viewers viewing the content may have made an audible noise, such as a scream. Corresponding user devices may have captured the screams of the viewers, and a back-end server may have combined the screams from the various users to generate a crowdsourced audio track. At the trigger point, the user device, shown in FIG. 1, may also capture (at "3") local audio (e.g., using a microphone integrated in the user device), such as a scream, and/or another utterance or noise, made by a user viewing the content. In this manner, the user's experience may be enhanced, by hearing audio from other viewers, while the user's own utterances may be further used to improve the crowdsourced audio track.

Figure 2:
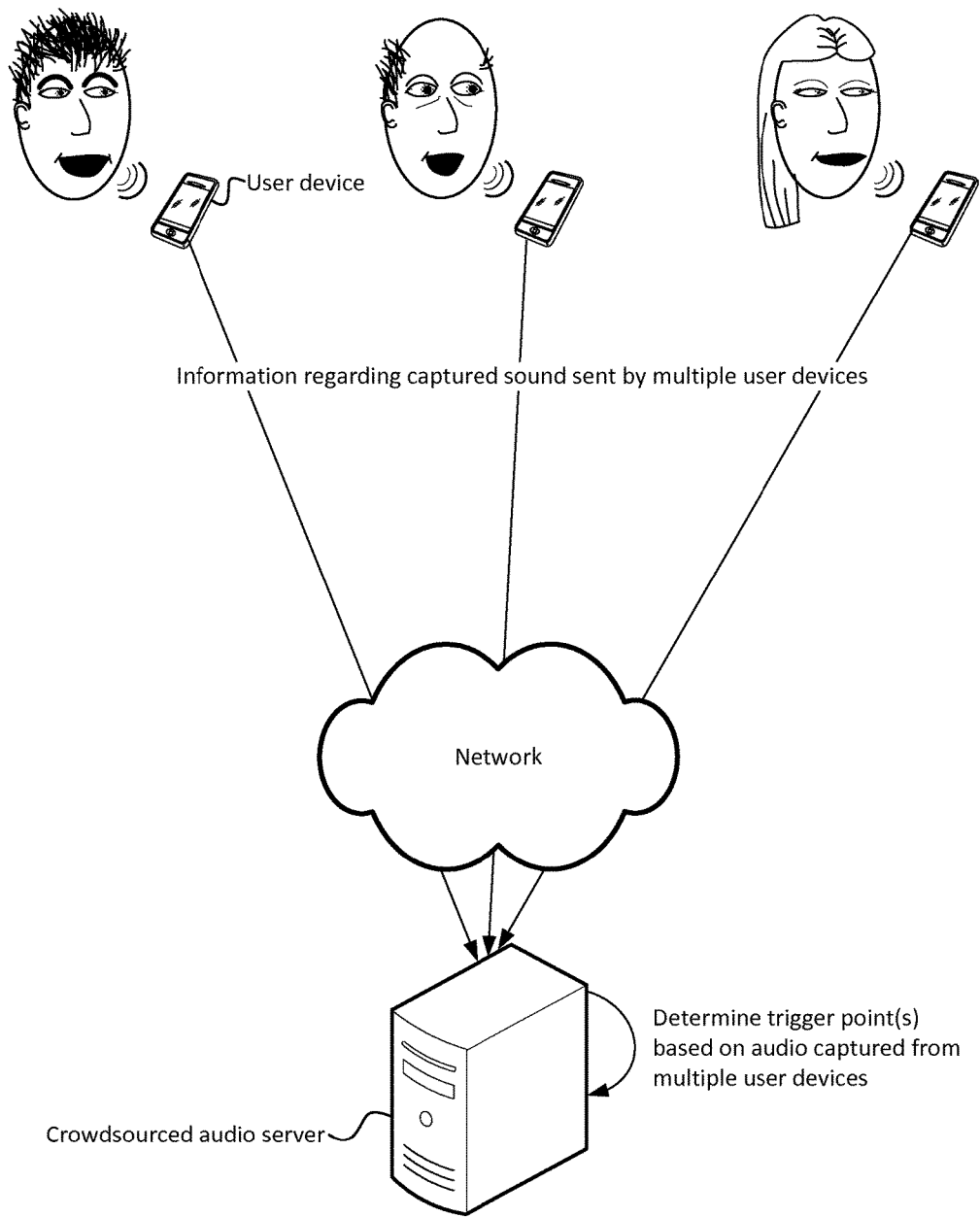
FIG. 2 illustrates an example overview of one or more implementations described herein, in which local audio from multiple sources may be used to detect a trigger point associated with particular content.

FIG. 2 illustrates another example overview, in which local audio from multiple sources may be used to detect a trigger point associated with particular content. For example, as shown, multiple user devices (i.e., three user devices, in this example) may capture audio (e.g., via respective microphones) while playing back content. The audio may be captured after the express consent of the user, and the user may retain full authority and/or control over whether the audio capturing can be enabled or disabled. For example, a video notification may be displayed (e.g., an icon), indicating that the user device is capturing audio.

As described in further detail below, the user devices may provide captured audio (e.g., via a network, such as the Internet) to a back-end server, such as a crowdsourced audio server. The user devices may indicate times, during the presentation of content, at which the audio was recorded. Based on this information, the crowdsourced audio server may be able to determine trigger points in the content. For example, as will be described below, the crowdsourced audio server may determine that a time in the content at which a relatively large proportion of the user devices (e.g., 80% or more) that corresponds to audible noise from viewers of the user devices, corresponds to a trigger point in the content. As mentioned above, the trigger point may be used to play back crowdsourced audio for subsequent viewers, and/or may be used to capture additional audio from subsequent viewers.

Figure 3:
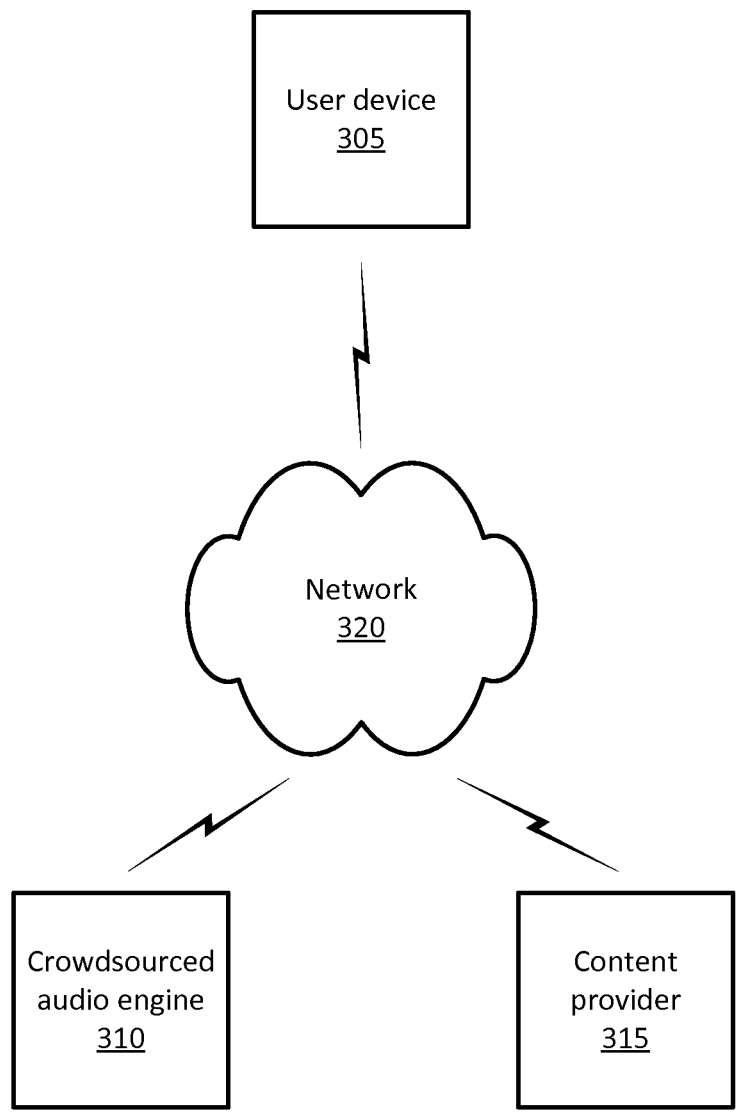
FIG. 3 illustrates an example environment, in which systems and/or methods, described herein, may be implemented.

FIG. 3 illustrates an example environment 300, in which systems and/or methods described herein may be implemented. As shown in FIG. 3, environment 300 may include user device 305, crowdsourced audio engine 310, content provider 315, and network 320.

The quantity of devices and/or networks, illustrated in FIG. 3, is provided for explanatory purposes only. In practice, environment 300 may include additional devices and/or networks; fewer devices and/or networks; different devices and/or networks; or differently arranged devices and/or networks than illustrated in FIG. 3. For example, while not shown, environment 300 may include devices that facilitate or enable communication between various components shown in environment 300, such as routers, modems, gateways, switches, hubs, etc. Alternatively, or additionally, one or more of the devices of environment 300 may perform one or more functions described as being performed by another one or more of the devices of environments 300. Devices of environment 300 may interconnect with each other and/or other devices via wired connections, wireless connections, or a combination of wired and wireless connections. In some implementations, one or more devices of environment 300 may be physically integrated in, and/or may be physically attached to, one or more other devices of environment 300. Also, while "direct" connections are shown in FIG. 3 between certain devices, some devices may communicate with each other via network 320 (and/or another network).

User device 305 may include any computation and communication device that is capable of communicating with one or more networks (e.g., network 320). For example, user device 305 may include a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a set-top device ("STD"), a personal gaming system, a wearable device, and/or another type of computation and communication device. User device 305 may include logic and/or hardware circuitry to communicate via one or more "short range" wireless protocols, such as WiFi (e.g., based on an Institute of Electrical and Electronics Engineers Institute of Electrical and Electronics Engineers ("IEEE") 802.11-based standard), Bluetooth, Near Field Communications ("NFC"), ZigBee (e.g., based on an IEEE 803.15.4-based standard), or the like. User device 305 may also include logic and/or hardware circuitry to communicate via a wireless telecommunications protocol (e.g., via cellular network 310), such as Long-Term Evolution ("LTE"), Third Generation Partnership Project ("3GPP") Third Generation ("3G"), Code Division Multiple Access ("CDMA") 2000 1X, and/or another wireless telecommunications protocol.

Crowdsourced audio engine 310 may include one or more server devices (e.g., a single physical device or a distributed set of devices) that perform one or more functions related to generating and/or providing crowdsourced audio, as described herein. For example, crowdsourced audio engine 310 may receive local audio from one or more user devices 305 (e.g., audio recorded by microphones of respective user devices 305), may mix the audio into crowdsourced audio, and may provide the audio to other user devices 305 at respective trigger points in content. In some implementations, crowdsourced audio engine 310 may receive instructions from content provider 315, indicating trigger points in content, at which crowdsourced audio should be provided. The functionality of crowdsourced audio engine 310 is described in greater detail below.

Content provider 315 may include one or more server devices (e.g., a single physical device or a distributed set of devices) that provide content (e.g., streaming content) to user device 305. For example, as described below, content provider 315 may provide playlists, such as HLS playlists and/or MPD playlists, which may be used by user device 305 to obtain streaming content. Content provider 315 may receive requests from user device 305 for content (e.g., content specified in a particular playlist), and may provide the content to user device 305 in a streaming manner. In some implementations, content provider 315 may be, or may be communicatively coupled to, a content delivery network ("CDN"), which may cache content at "edges" of networks, in order to reduce the load within a network (e.g., within an Internet service provider's network).

Network 320 may include one or more radio access networks ("RANs"), via which user device 305 may access one or more other networks or devices, a core network of a wireless telecommunications network, an Internet Protocol ("IP")-based PDN, a wide area network ("WAN") such as the Internet, a private enterprise network, and/or one or more other networks. User device 305 may connect, via network 320, to data servers, application servers, other user devices 305, etc. Network 320 may be connected to one or more other networks, such as a public switched telephone network ("PSTN"), a public land mobile network ("PLMN"), and/or another network.

Figure 4:
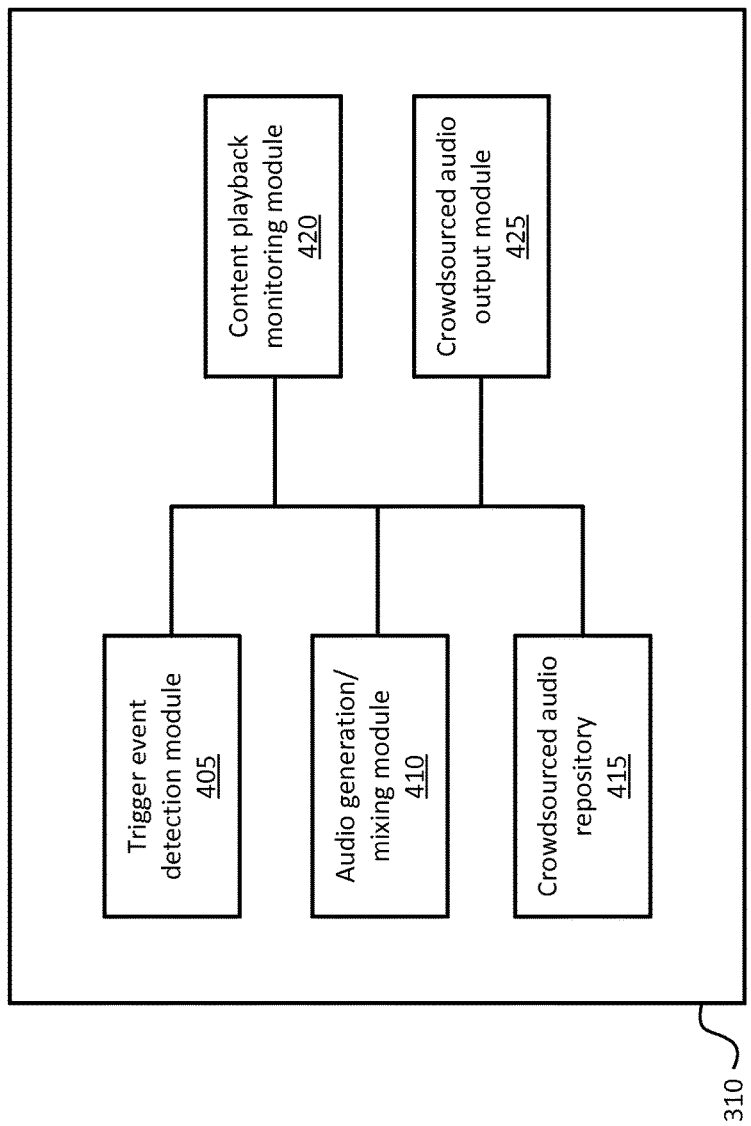
FIG. 4 illustrates example functional components of a crowdsourced audio server.

FIG. 4 illustrates example functional components of crowdsourced audio engine 310. As shown, crowdsourced audio engine 310 may include trigger event detection module 405, audio generation/mixing module 410, crowdsourced audio repository 415, content playback monitoring module 420, and crowdsourced audio output module 425. Some or all of components 405-425 may be implemented as hardware circuitry, software logic, and/or some combination thereof. In some implementations, crowdsourced audio engine 310 may include additional components, fewer components, and/or differently arranged components than shown in FIG. 4.

Trigger event detection module 405 may detect trigger events in content, such as video content. For example, trigger event detection module 405 may receive information, from one or more user devices 305, regarding audio captured at respective user devices 305. The received information may indicate, for example, which content was playing when audio was captured at user device 305 (e.g., a name of the content, a file name of the content, and/or some other identifier of the content), and a point in the content at which the audio was captured (e.g., as denoted by a time that has elapsed in the content after the beginning of the content).

In some implementations, trigger event detection module 405 may include an interface, such as an implementation of an application programming interface ("API"), via which trigger event detection module 405 communicates with user devices 305. Trigger event detection module 405 may, in some implementations, receive audio from user devices 305, such as audio captured by user devices 305 while user devices 305 play content. The received audio may correspond to particular points in the content, at which user devices 305 detect audio (e.g., local audio, captured by a microphone of user device 305). In some implementations, the received audio may correspond to audio captured during the entire presentation of content. For instance, user devices 305 may continuously stream captured audio to trigger event detection module 405.

As mentioned above, the audio, captured by user devices 305, may be captured and/or transmitted with the express consent of users of user devices 305. The users may retain the option of preventing the capture and/or transmission of such audio, and may further retain the option to permanently delete any captured audio stored at user device 305 and/or transmitted to any other device, such as crowdsourced audio engine 310.

Trigger event detection module 405 may analyze the audio, received from user devices 305, to detect trigger points in particular content. For example, trigger event detection module 405 may identify points in the content (the term "point" may refer to a particular time or timeframe in the content, as measured by the amount of time or times that has/have elapsed since the beginning of the content), at which a relatively large quantity of user devices 305 have provided captured audio. For instance, for a point that is 35 minutes into a particular horror movie, a relatively large quantity of user devices 305 may have provided captured audio (e.g., screams or gasps) that was captured 35 minutes into the presentation of the movie.

In some implementations, the "relatively large quantity" may be a quantity of instances of captured audio that is greater than a predetermined quantity (e.g., at least 50, at least 100, etc.). In some implementations, the "relatively large quantity" may be a relative proportion, as compared to a total quantity of user devices 305 that have received and/or presented the content. For example, if 1,000 user devices 305 have received and/or presented the example horror movie, and at least 50% (i.e., 500, in this example) of the user devices 305 have provided captured audio that corresponds to the particular point, trigger event detection module 405 may identify the particular point as a trigger point.

In some implementations, trigger event detection module 405 may analyze the audio itself, in order to detect a type of audible response. For example, using known voice and/or speech recognition patterns, trigger event detection module 405 may be able to detect whether captured audio includes gasps, screams, laughs, and/or other particular types of audible reactions. Trigger event detection module 405 may classify the captured audio, when detecting trigger points. For example, assume that a trigger point for a particular horror movie is detected when at least 50% of the audible reactions for a particular point are gasps or screams. Further assume that trigger event detection module 405 receives an indication that 1,000 user devices 305 have received the content, that 400 user devices 305 have provided captured audio that includes gasps or screams, and that 100 user devices 305 have provided captured audio that includes other types of utterances (e.g., speech and/or laughter). In this example, 50% of user devices 305 have provided captured audio that corresponds to the same particular point in the content. However, since only 40% correspond to the same type of utterance (e.g., gasps or screams), while another 10% correspond to a different type of utterance, trigger event detection module 405 may not determine that this point corresponds to a trigger point in the content.

In this manner, errant captured audio may be omitted, thereby reducing unwanted noise. For example, if a viewer talks during a movie (or even if several viewers talk during the movie, at the same point in the movie), trigger event detection module 405 may forgo detecting trigger points at these times, since the quantity or proportion of captured audio may be below a threshold. Additionally, trigger event detection module 405 may detect that the audio corresponds to speech, and may forgo considering such audio when detecting trigger points.

Trigger event detection module 405 may also store and/or output information regarding detected trigger events. For example, when user device 305 receives and/or presents content, user device 305 may request information, from trigger event detection module 405, indicating trigger points associated with the content. Additionally, or alternatively, trigger event detection module 405 may receive an indication from another source (e.g., from content provider 315), indicating that user device 305 is receiving and/or presenting the content, and may "push" the information, indicating the trigger points, to user device 305.

Audio generation/mixing module 410 may generate and/or mix a crowdsourced audio track that corresponds to trigger events (e.g., as detected by trigger event detection module 405). For example, audio generation/mixing module 410 may receive audio from trigger event detection module 405 and/or from user device 305, and an indication that the audio corresponds to a trigger event. Audio generation/mixing module 410 may generate a crowdsourced audio track that includes the received audio. Audio generation/mixing module 410 may perform a volume normalization procedure, such that some users' utterances are not louder than other users' utterances. In some implementations, audio generation/mixing module 410 may perform other signal processing, such as spatial and/or directional audio techniques, in order to create a "surround sound" effect. For example, the crowdsourced audio "track" produced by audio generation/mixing module 410 may include multiple channels (e.g., center, front left, front right, rear left, rear right, etc), which may carry different parts of the received audio, in order to provide the surround sound effect. In some implementations, audio generation/mixing module 410 may modify existing crowdsourced audio tracks (e.g., when receiving additional audio from user devices 305, after an audio track has already been generated by audio generation/mixing module 410 and/or another device or component). Crowdsourced audio repository 415 may store the crowdsourced audio tracks created and/or modified by audio generation/mixing module 410.

Content playback monitoring module 420 may receive requests, from user device 305, for crowdsourced audio (e.g., audio tracks stored by crowdsourced audio repository 415). For example, user device 305 may request the crowdsourced audio based on trigger points, indicated by information provided by trigger event detection module 405. As another example, user device 305 may periodically and/or intermittently provide information regarding a point in the content being presented, and content playback monitoring module 420 may determine whether a trigger point is upcoming (e.g., within the next 10 seconds, within the next 20 seconds, etc.).

Crowdsourced audio output module 425 may provide crowdsourced audio to user device 305, such as when user device 305 requests the crowdsourced audio and/or when content playback monitoring module 420 determines that a trigger point is upcoming in content being presented and/or received by user device 305. Crowdsourced audio output module 425 may, for instance, retrieve a crowdsourced audio track, from crowdsourced audio repository 415, that corresponds to an upcoming trigger point (and/or all crowdsourced audio tracks that correspond to playing content, such as all crowdsourced audio tracks that correspond to a particular movie), and may provide the retrieved crowdsourced audio track to user device 305.

Figure 5:
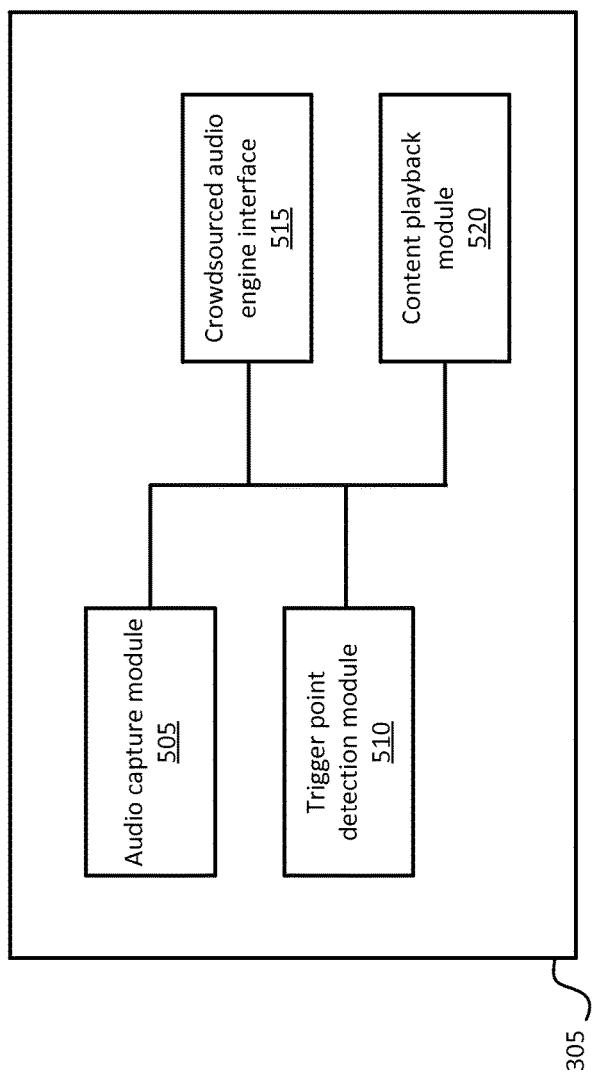
FIG. 5 illustrates example functional components of a user device.

FIG. 5 illustrates example functional components of user device 305. As shown, user device 305 may include audio capture module 505, trigger point detection module 510, crowdsourced audio engine interface 515, and content playback module 520. Some or all of components 505-520 may be implemented as hardware circuitry, software logic, and/or some combination thereof. In some implementations, user device 305 may include additional components, fewer components, and/or differently arranged components than shown in FIG. 5.

Audio capture module 505 may include, or be communicatively coupled to, a device that captures audio, such as a microphone. In some implementations, audio capture module 505 may capture audio (referred to as "local audio,"

which is audio that is able to be captured by the microphone of user device 305) based on a determination that content is being played by user device 305 (e.g., by content playback module 520). In some implementations, audio capture module 505 may capture audio based on detecting that a trigger point has been reached in content playing at user device 305. As described below, trigger point detection module 510 may make such a determination, and may notify audio capture module 505 regarding a detected trigger point. Audio capture module 505 may provide captured audio to crowdsourced audio engine 310, and/or another device, via crowdsourced audio engine interface 515 (which may be an interface to crowdsourced audio engine 310, such as an implementation of an API).

As further described below (e.g., with respect to FIG. 6), trigger point detection module 510 may detect local audio events (e.g., an utterance, such as a laugh, a scream, a gasp, etc.), and may report the local audio event to crowdsourced audio engine 310. In some implementations, trigger point detection module 510 may provide captured audio, that corresponds to the detected local audio event, to crowdsourced audio engine 310. For example, if trigger point detection module 510 determines that a scream was captured, via audio capture module 505, trigger point detection module 510 may determine a time location in playing content that the scream was captured, and may provide the audio, that includes the scream, to crowdsourced audio engine 310.

When not capturing audio, audio capture module 505 may be "off" or "disabled." That is, for instance, audio capture module 505 may forgo capturing audio when content is not playing at user device 305, when content is playing but a trigger point has not been indicated, and/or when a user of user device 305 has not indicated that he or she desires audio to be captured (or when he or she has indicated that he or she does not want audio to be captured). In this manner, users may be afforded the utmost protection of privacy, by preventing the unwanted capture of audio by user device 305. Furthermore, in some implementations, audio capture may never be enabled unless a user explicitly indicates that he or she has authorized the audio capture (e.g., via an "opt in" process).

Trigger point detection module 510 may monitor content that is playing at user device 305 (e.g., may periodically and/or intermittently track a time position of the playing content), and may compare the time position of the playing content to a time position indicated by one or more trigger points in order to determine whether a trigger point has been reached. For example, as mentioned above, user device 305 may receive information regarding trigger points, associated with playing content, when receiving the content and/or when playing the content (e.g., via crowdsourced audio engine interface 515). As another example, trigger point detection module 510 may provide (e.g., via crowdsourced audio engine interface 515) information regarding a time position of playing content (e.g., on a period or intermittent basis) to crowdsourced audio engine 310. Crowdsourced audio engine 310 may determine, based on the time position of the playing content, whether any trigger points are upcoming, may notify trigger point detection module 510 of the upcoming trigger points, and may provide crowdsourced audio associated with any upcoming trigger points.

When a trigger point has been reached, trigger point detection module 510 may instruct audio capture module 505 to begin capturing audio (e.g., via a microphone associated with user device 305). Trigger point detection module 510 may also provide crowdsourced audio, associated with the trigger point, to content playback module 520. Content playback module 520 may play the crowdsourced audio, during the presentation of the content, at the trigger point. In some implementations, content playback module 520 may normalize a volume of the crowdsourced audio, so that the crowdsourced audio is not significantly louder or quieter than the currently playing content.

Figure 6:
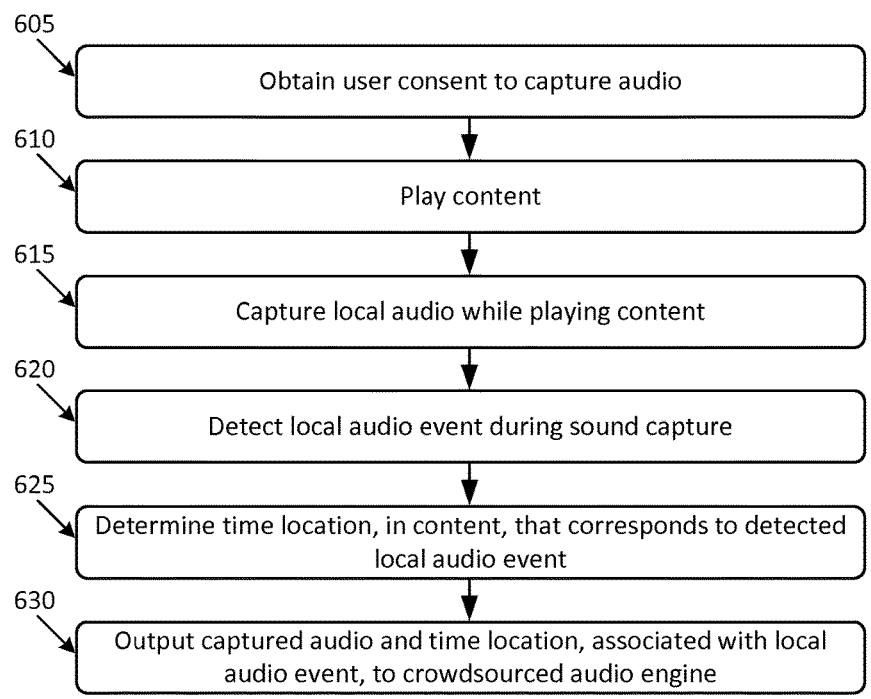
FIG. 6 illustrates an example process for providing information, regarding captured local audio, to a crowdsourced audio server.

FIG. 6 illustrates an example process 600 for providing information; regarding captured local audio, to a crowdsourced audio server. In some implementations, process 600 may be performed by user device 305 (e.g., by one or more components discussed above with respect to FIG. 5). In other implementations, some or all of process 600 may be performed by one or more other devices in addition to, or in lieu of, user device 305.

As shown, process 600 may include obtaining (at 605) user consent to capture audio. For example, user device 305 (and/or another device) may request a user's consent to capture audio at user device 305 (e.g., via a microphone of user device 305). The request may be presented via user device 305, the user's laptop, and/or another device, via a web-based interface, or any other type of interface. In some implementations, the user may also be provided with an option to revoke the consent, to browse through the user's audio that has been captured, stored, or transmitted, and/or to delete any captured audio.

Process 600 may further include playing (at 610) content. For example, user device 305 (e.g., content playback module 520) may play content, such as video content. The content may be pre-recorded content stored at user device 305, live broadcasted streaming content, pre-recorded streaming content, or the like.

Process 600 may also include capturing (at 615) local audio while playing content. For example, user device 305 (e.g., audio capture module 505) may capture local audio while the content is playing. In some implementations, user device 305 may filter audio, associated with the content, while capturing local audio. In this sense, the audio captured by user device 305 may truly be "external" audio and not feedback—that is, local audio that does not include the audio of the playing content.

Process 600 may additionally include detecting (at 620) a local audio event during sound capture. For example, user device 305 may detect a non-speech utterance, such as a yell, a laugh, or the like. In some implementations, the detected audio may include normal speech, such as a viewer speaking to another viewer. In some such instances, user device 305 may filter out speech, as speech may typically not be desirable audio to share with other viewers. In some implementations, user device 305 may not filter out speech, so that crowdsourced audio engine 310 may still have all data available when detecting trigger events based on audio provided by multiple user devices 305. In some such implementations, crowdsourced audio engine 310 may omit speech when detecting trigger events. In alternative implementations, crowdsourced audio engine 310 may include speech when detecting trigger events.

Process 600 may further include determining (at 625) a time location, in the content, that corresponds to the detected local audio event. For example, user device 305 may determine a time location in the content, such as an amount of time that has transpired since the start of the content, at which the local audio event was captured.

Process 600 may also include outputting (at 630) the captured audio and time location, associated with the local audio event, to crowdsourced audio engine 310. As described below with respect to, for example, FIG. 7, crowdsourced audio engine 310 may use this information (e.g., from multiple user devices 305) to detect trigger events in the content, at which crowdsourced audio should be played back.

Figure 7:
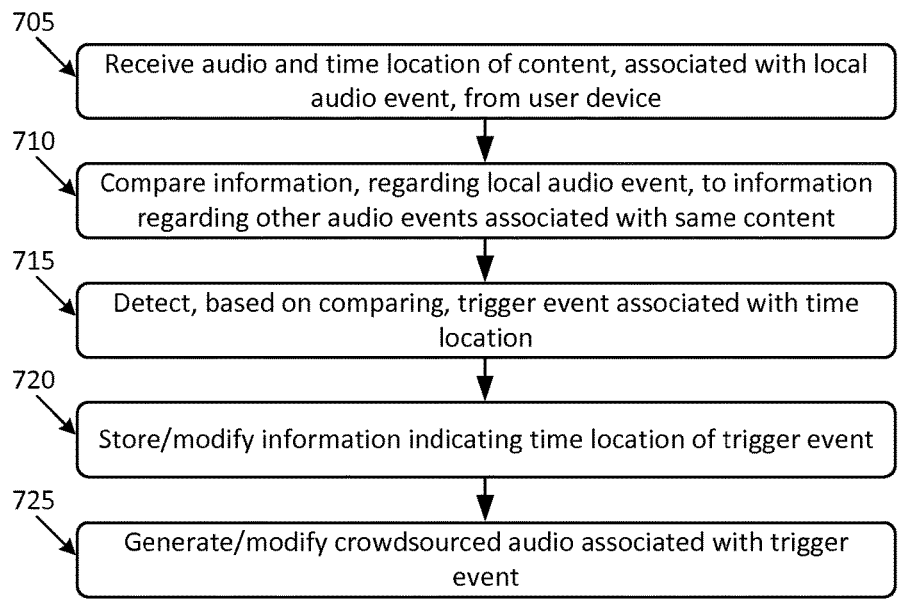
FIG. 7 illustrates an example process for detecting a crowdsourced audio event associated with particular content.

FIG. 7 illustrates an example process 700 for detecting a crowdsourced audio event associated with particular content. In some implementations, process 700 may be performed by crowdsourced audio engine 310 (e.g., by one or more components discussed above with respect to FIG. 4). In other implementations, some or all of process 700 may be performed by one or more other devices in addition to, or in lieu of, crowdsourced audio engine 310.

As shown, process 700 may include receiving (at 705) audio and a time location of content, associated with a local audio event, from a user device. For example, as described above, crowdsourced audio engine 310 may receive information, including captured local audio and a time location of content, associated with a local audio event.

Process 700 may also include comparing (at 710) the received information regarding the local audio event to information regarding other audio events associated with the same content. For example, crowdsourced audio engine 310 may have previously received similar information from a number of other user devices 305 (e.g., from 100 other user devices 305, from 1,000 other user devices 305, etc.). Crowdsourced audio engine 310 may determine a quantity of other instances in which user devices 305 have provided information indicating a local audio event at the same time position in the same content. For example, a comedy movie may feature a particularly funny scene, during which a relatively large quantity of users may make laugh audibly.

Process 700 may further include detecting (at 715), based on the comparing, a trigger event associated with the time location of the received local audio event. For instance, crowdsourced audio engine 310 may determine that at least a threshold quantity of user devices 305 have provided information, indicating that local audio was captured at the same time location of the content. Additionally, or alternatively, crowdsourced audio engine 310 may analyze a proportion, of user devices 305 that reported a local audio event at the time location, to user devices 305 that received and/or played the content, but did not report a local audio event at that time. Detecting trigger events based on the proportion of local audio events versus total plays of content may allow crowdsourced audio engine 310 to determine time positions that are relatively likely to be associated with trigger events. For example, if one movie was viewed 1,000 times, while another movie was viewed 1,000,000 times, a threshold of 100 local audio events, at a particular time position, may be more appropriate for the first movie. Similarly, a threshold of 10,000 local audio events may be more appropriate for the second movie.

Process 700 may additionally include storing and/or modifying (at 720) information indicating the time location of the detected trigger event. For example, as described below, the stored information may be useful when subsequently providing crowdsourced audio, associated with the trigger event to user devices 305 that play the content.

Process 700 may also include generating and/or modifying (at 725) crowdsourced audio associated with the trigger event. For example, crowdsourced audio engine 310 may store crowdsourced audio, which may include local audio (such as that received at 705) from multiple user devices 305. In situations where crowdsourced audio engine 310 already stores crowdsourced audio associated with the trigger event, crowdsourced audio engine 310 may modify the already-stored crowdsourced audio to now include the local audio received at 705. In this manner, the crowdsourced audio may be continually evolving and improving. In some implementations, crowdsourced audio engine 310 may monitor how many different tracks of local audio have been combined to create a crowdsourced audio track, and may forgo modifying the crowdsourced audio track past a threshold quantity of different local audio tracks. This may prevent the crowdsourced audio track from becoming muddled.

Figure 8:
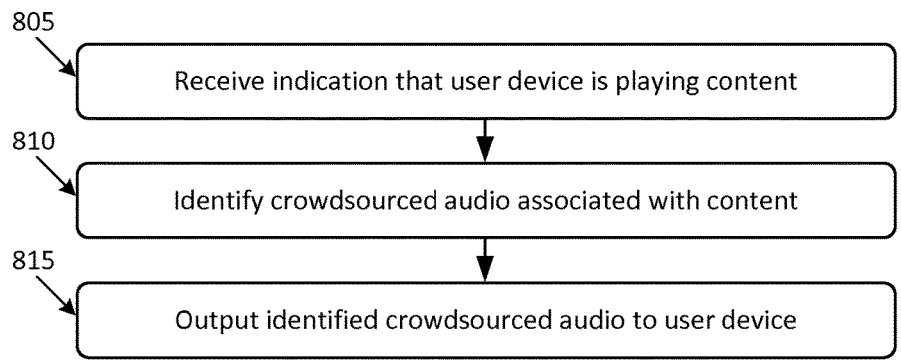
FIGS. 8 and 9 illustrate example processes for outputting crowdsourced audio at a trigger point in playing content.
Figure 9:
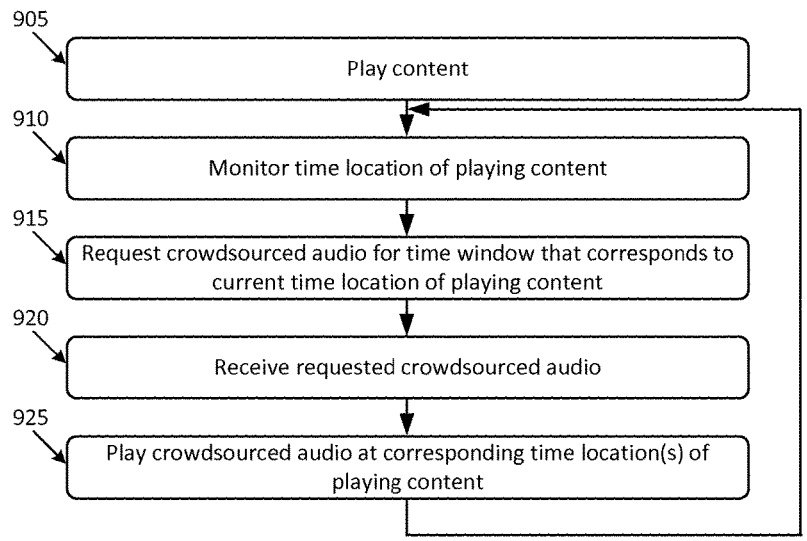

FIGS. 8 and 9 illustrate example processes 800 and 900, respectively, for outputting crowdsourced audio at a trigger point in playing content. In some implementations, process 800 may be performed by crowdsourced audio engine 310, and process 900 may be performed by user device 305. In other implementations, some or all of processes 800 and/or 900 may be performed by one or more other devices.

As shown in FIG. 8, process 800 may include receiving (at 805) an indication that a user device is playing content. For example, crowdsourced audio engine 310 may receive an indication from user device 305 and/or from content provider 315, indicating that user device 305 is playing a particular content item. In some implementations, crowdsourced audio engine 310 may receive the indication at the beginning of playback, by user device 305, of the content. In some implementations, crowdsourced audio engine 310 may periodically and/or intermittently receive the indication, during playback (e.g., every 30 seconds, every 5 minutes, etc.), indicating a time position in the content that is currently being played back.

Additionally, or alternatively, crowdsourced audio engine 310 may receive information indicating that user device 305 has received (but is not necessarily currently playing) the content. For example, user device 305 may have downloaded the content from content provider 315, for later viewing (potentially for "offline" viewing, during which user device 305 may not have network connectivity and thus may not communicate with crowdsourced audio engine 310 and/or other devices during playback of the content). In such situations, the indication may indicate that the content has been downloaded, and is not being streamed and/or presented in real time.

Process 800 may also include identifying (at 810) crowdsourced audio associated with the content. For example, crowdsourced audio engine 310 may identify one or more trigger events associated with the content, indicated at 805. The trigger events may be trigger events detected by crowdsourced audio engine 310 (e.g., in a manner similar to that described above with respect to FIG. 8), and/or may be trigger events that were manually defined by an operator of content provider 315 and/or by a creator of the content.

In situations where the content is being presented, by user device 305, in real time (and thus, where user device 305 is periodically and/or intermittently providing the time position of the content to crowdsourced audio engine 310), crowdsourced audio engine 310 may identify upcoming crowdsourced audio within a particular timeframe of the last reported time position of the content (e.g., within the next 30 seconds, the next 5 minutes, etc., of the last reported time position). Furthermore, in situations where the content has been downloaded by crowdsourced audio engine 310, crowdsourced audio engine 310 may identify all of the crowdsourced audio associated with the content. In some implementations, even if the content is being presented in real time, crowdsourced audio engine 310 may identify all of the crowdsourced audio associated with the content.

Process 800 may further include outputting (at 815) the identified crowdsourced audio to the user device. For example, crowdsourced audio engine 310 may output the crowdsourced audio, associated with upcoming trigger events (and/or the entire content, as may be appropriate) to user device 305.

Referring to FIG. 9, process 900 may include playing (at 905) content, and monitoring (at 910) a time location of the playing content. Process 900 may further include requesting (at 915) crowdsourced audio for a time window that corresponds to a current time location of playing content. For example, user device 305 may request (to crowdsourced audio engine 310) crowdsourced audio that corresponds to a 30-second window, a 5-minute window, etc. These windows may represent upcoming windows of time during the presentation of the content.

Process 900 may additionally include receiving (at 920) the requested crowdsourced audio. For example, user device 305 may receive (from crowdsourced audio engine 310) one or more crowdsourced audio tracks, that correspond to one or more trigger events in the requested window. User device 305 may also receive time position information, specifying a time during the presentation of the content (i.e., trigger events), during which the crowdsourced audio should be played.

Process 900 may also include playing (at 925) the crowdsourced audio at the corresponding time location(s) of the playing content. In some implementations, user device 305 may also record local audio during the trigger events. For instance, in some implementations, a user may not have provided authorization for user device 305 to continuously capture audio, but may have provided authorization for user device 305 to capture audio at potential trigger events. In some such implementations, user device 305 may capture local audio at these times. As shown, one or more of blocks 910-925 may be repeated in an iterative process. For example, assuming that user device 305 requests (at 915) crowdsourced audio every 5 minutes, blocks 910-925 may be repeated every 5 minutes, and the time window (indicated in the request at 915) may be 5 minutes.

Figure 10:
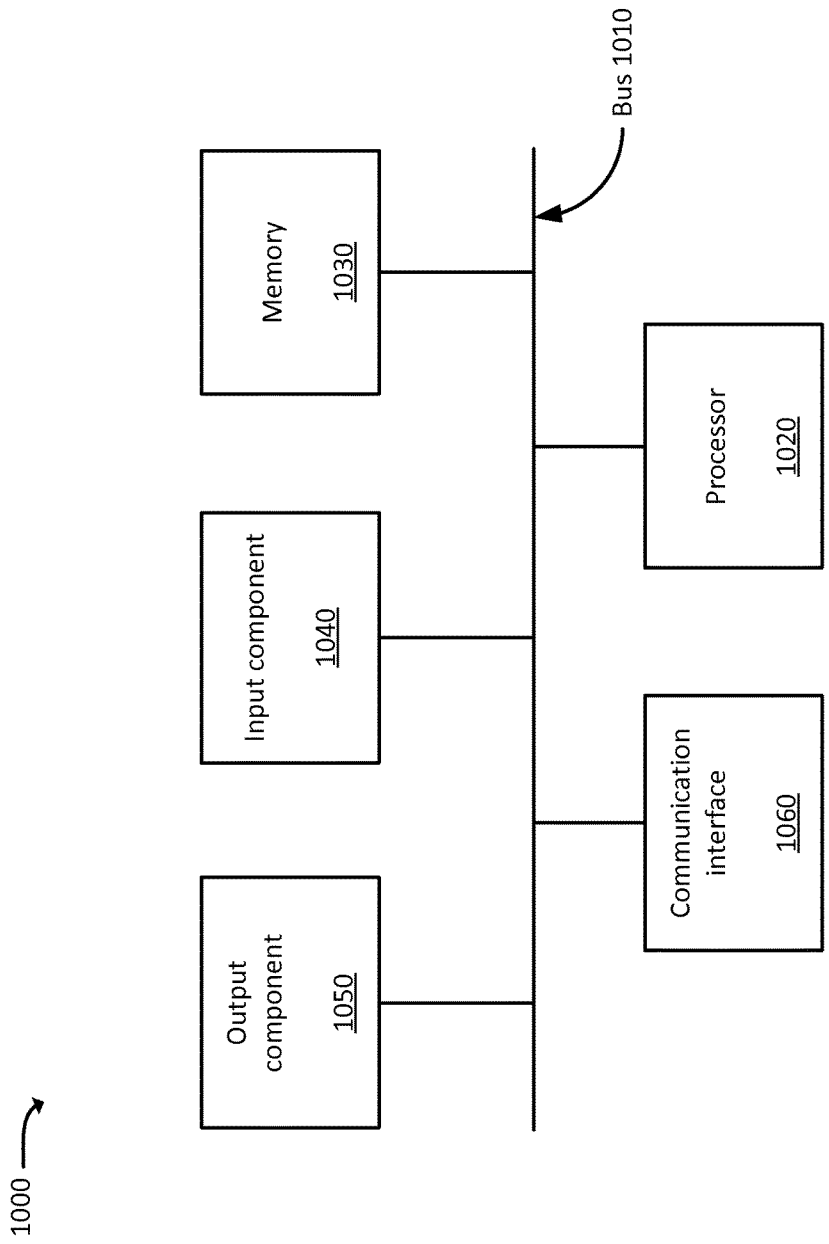
FIG. 10 illustrates example components of a device, in accordance with some implementations described herein.

FIG. 10 is a diagram of example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while discussed in the context of captured audio from multiple user devices being used to determine whether a trigger event has occurred (e.g., as discussed above with respect to block 710), similar techniques may be used for audio captured by other types of devices. For example, for live broadcasted content (e.g., sporting events, live comedy shows, etc.), one or more microphones may be placed such that noise from a live audience (e.g., an audience in a football stadium) may be captured. In some implementations, when a sound level of the noise exceeds a threshold sound level, a trigger point may be detected. Due to the nature of live broadcasting, a brief delay (e.g., a two to five-second delay) may be present in between the time of the capture and the broadcast to a viewing audience. Prior to, or contemporaneous with, the broadcast of the content to user devices 305, of the viewing audience, crowdsourced audio engine 310 (or another device) may output the captured audio (e.g., the relatively loud crowd noise) to user device 305. In this manner, the ordinary presentation of the content may be further enhanced by extra noise captured at a place relevant to the content. For example, when a football team scores in their "home" stadium, the live audience may make particularly loud cheering noises. In accordance with implementations described herein, these particularly loud cheering noises may be conveyed to the viewing audience.

As another example, in some implementations, various techniques, some examples of which have been described above, may be used in combination, even though such combinations are not explicitly discussed above. Furthermore, some of the techniques, in accordance with some implementations, may be used in combination with conventional techniques.

Additionally, while series of blocks have been described with regard to FIGS. 6-9, the order of the blocks and/or signals may be modified in other implementations. Further, non-dependent blocks and/or signals may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more memory devices storing processor-executable instructions; and
   one or more processors configured to execute the processor-executable instructions, wherein executing the processor-executable instructions causes the one or more processors to:
     receive, from a plurality of user devices, local audio information pertaining to a particular content item, wherein a particular instance of local audio information, received from a particular user device, includes:
       local audio, captured by the particular user device, during playback of the particular content item; and
       information indicating a particular time position, in the particular content item, at which the local audio was captured;
     determine, based on the received local audio information, from the plurality of user devices, that the particular time position in the particular content item is associated with a trigger event, wherein when determining, that the particular time position in the particular content item is associated with the trigger event, the device is further configured to:
       determine a first quantity of user devices that have received or presented the particular content item;
       determine that a second quantity of instances of local audio information, received from the plurality of user devices, that correspond to the particular time position in the particular content item, exceeds a threshold quantity; and
       determine that a ratio of the second quantity to the first quantity exceeds a threshold ratio;
     generate or modify, based on the determination that the particular time position is associated with the trigger event, an audio track, including the local audio, captured by at least two user devices, of the plurality of user devices; and
     provide the audio track to another user device that has received the particular content item, wherein the other user device plays the generated audio track, while playing the particular content item, at the particular time position in the particular content item.

2. The device of claim 1, wherein the threshold quantity is a first threshold quantity,
   wherein executing the processor-executable instructions, to determine that the particular time position in the particular content item is associated with the trigger event, further causes the one or more processors to:
     determine that a quantity of instances of local audio information, received from the plurality of user devices, that correspond to the particular time position in the particular content item, exceeds a second threshold quantity.

3. The device of claim 1, wherein the particular user device is a first user device, wherein executing the processor-executable instructions further causes the one or more processors to:
   detect speech in local audio received from a second user device, the speech having been captured at the particular time position in the particular content item; and omit the local audio, received from the second user device, when determining that the particular time position in the particular content item is associated with the trigger event, the omitting being based on the local audio from the second user device including speech.

4. The device of claim 1, wherein executing the processor-executable instructions further causes the one or more processors to:
   detect that the local audio, received from the particular user device, includes a non-speech utterance, the local audio having been captured at the particular time position in the particular content item.

5. The device of claim 1, wherein executing the processor-executable instructions, to generate or modify the audio track, further causes the one or more processors to:
   normalize a volume of the local audio, captured by the at least two user devices.

6. The device of claim 1, wherein executing the processor-executable instructions further causes the one or more processors to:
   receive an indication that the other user device is presenting the particular content item, and that a current time position, during the presenting of the particular content item, is within a threshold time of the particular time position associated with the trigger event,
   wherein the providing of the audio track is performed based on the indication that the other user device is presenting the particular content item, and that the current time position, during the presenting of the particular content item, is within the threshold time of the particular time position associated with the trigger event.

7. The device of claim 1, wherein executing the processor-executable instructions further causes the one or more processors to:
   receive an indication that the other user device has downloaded the particular content item for offline viewing,
   wherein the providing of the audio track is performed based on the indication that the other user device has downloaded the particular content item for offline viewing.

8. A method, comprising:
   receiving, by one or more server devices and from a plurality of user devices, local audio information pertaining to a particular content item, wherein a particular instance of local audio information, received from a particular user device, includes:
      local audio, captured by the particular user device, during playback of the particular content item; and
      information indicating a particular time position, in the particular content item, at which the local audio was captured;
   determining, by the one or more server devices and based on the received local audio information, from the plurality of user devices, that the particular time position in the particular content item is associated with a trigger event, wherein determining, that the particular time position in the particular content item is associated with the trigger event, includes:
      determining a first quantity of user devices that have received or presented the particular content item;
      determining that a second quantity of instances of local audio information, received from the plurality of user devices, that correspond to the particular time position in the particular content item, exceeds a threshold quantity; and
      determining that a ratio of the second quantity to the first quantity exceeds a threshold ratio;
   generating or modifying, by the one or more server devices and based on the determination that the particular time position is associated with the trigger event, an audio track, including the local audio, captured by at least two user devices, of the plurality of user devices; and
   providing, by the one or more server devices, the audio track to another user device that has received the particular content item, wherein the other user device plays the generated audio track, while playing the particular content item, at the particular time position in the particular content item.

9. The method of claim 8, wherein the threshold quantity is a first threshold quantity,
   wherein determining, that the particular time position in the particular content item is associated with the trigger event, includes:
      determining that a quantity of instances of local audio information, received from the plurality of user devices, that correspond to the particular time position in the particular content item, exceeds a second threshold quantity.

10. The method of claim 8, wherein the particular user device is a first user device, the method further comprising:
   detecting speech in local audio received from a second user device, the speech having been captured at the particular time position in the particular content item; and
   omitting the local audio, received from the second user device, when determining that the particular time position in the particular content item is associated with the trigger event, the omitting being based on the local audio from the second user device including speech.

11. The method of claim 8, further comprising:
   detecting that the local audio, received from the particular user device, includes a non-speech utterance, the local audio having been captured at the particular time position in the particular content item.

12. The method of claim 8, wherein generating or modifying the audio track comprises:
   normalizing a volume of the local audio, captured by the at least two user devices.

13. The method of claim 8, further comprising:
   receiving an indication that the other user device is presenting the particular content item, and that a current time position, during the presenting of the particular content item, is within a threshold time of the particular time position associated with the trigger event,
   wherein the providing of the audio track is performed based on the indication that the other user device is presenting the particular content item, and that the current time position, during the presenting of the particular content item, is within the threshold time of the particular time position associated with the trigger event.

14. The method of claim 8, further comprising:
   receiving an indication that the other user device has downloaded the particular content item for offline viewing,
   wherein the providing of the audio track is performed based on the indication that the other user device has downloaded the particular content item for offline viewing.

15. A non-transitory computer-readable medium, storing a set of processor-executable instructions, which, when executed by one or more processors, cause the one or more processors to:
- receive, from a plurality of user devices, local audio information pertaining to a particular content item, wherein a particular instance of local audio information, received from a particular user device, includes:
  - local audio, captured by the particular user device, during playback of the particular content item; and
  - information indicating a particular time position, in the particular content item, at which the local audio was captured;
- determine, based on the received local audio information, from the plurality of user devices, that the particular time position in the particular content item is associated with a trigger event, wherein the processor-executable instructions, to determine determining that the particular time position in the particular content item is associated with the trigger event, further include processor-executable instructions that cause the one or more processors to:
  - determine a first quantity of user devices that have received or presented the particular content item;
  - determine that a second quantity of instances of local audio information, received from the plurality of user devices, that correspond to the particular time position in the particular content item, exceeds a threshold quantity; and
  - determine that a ratio of the second quantity to the first quantity exceeds a threshold ratio;
- generate or modify, based on the determination that the particular time position is associated with the trigger event, an audio track, including the local audio, captured by at least two user devices, of the plurality of user devices; and
- provide the audio track to another user device that has received the particular content item, wherein the other user device plays the generated audio track, while playing the particular content item, at the particular time position in the particular content item.

16. The non-transitory computer-readable medium of claim 15, wherein the threshold quantity is a first threshold quantity,
- wherein execution of the processor-executable instructions, to determine that the particular time position in the particular content item is associated with the trigger event, further causes the one or more processors to:
  - determine that a quantity of instances of local audio information, received from the plurality of user devices, that correspond to the particular time position in the particular content item, exceeds a second threshold quantity.

17. The non-transitory computer-readable medium of claim 15, wherein the particular user device is a first user device, wherein execution of the processor-executable instructions further causes the one or more processors to:
- detect speech in local audio received from a second user device, the speech having been captured at the particular time position in the particular content item; and
- omit the local audio, received from the second user device, when determining that the particular time position in the particular content item is associated with the trigger event, the omitting being based on the local audio from the second user device including speech.

18. The non-transitory computer-readable medium of claim 15, wherein execution of the processor-executable instructions further causes the one or more processors to:
- detect that the local audio, received from the particular user device, includes a non-speech utterance, the local audio having been captured at the particular time position in the particular content item.

19. The non-transitory computer-readable medium of claim 15, wherein execution of the processor-executable instructions, to generate or modify the audio track, further causes the one or more processors to:
- normalize a volume of the local audio, captured by the at least two user devices.

20. The non-transitory computer-readable medium of claim 15, wherein execution of the processor-executable instructions further causes the one or more processors to:
- receive an indication that the other user device is presenting the particular content item, and that a current time position, during the presenting of the particular content item, is within a threshold time of the particular time position associated with the trigger event,
- wherein the providing of the audio track is performed based on the indication that the other user device is presenting the particular content item, and that the current time position, during the presenting of the particular content item, is within the threshold time of the particular time position associated with the trigger event.

* * * * *